United States Patent [19]

Turner

[11] 4,415,778
[45] Nov. 15, 1983

[54] SUBSCRIBER TELEPHONE TEST SET

[75] Inventor: Robert L. Turner, P.O. Box 44, Tate, Ga. 30177

[21] Appl. No.: 325,808

[22] Filed: Nov. 30, 1981

[51] Int. Cl.³ .................. H04B 17/00; H04M 1/24
[52] U.S. Cl. .................. 179/175.1 R; 179/175.3 F; 307/115
[58] Field of Search ......... 179/175.1 R, 175, 175.3 R, 179/175.3 F, 1 SW, 175.2 R; 324/52; 340/651, 652, 653; 307/115, 154

[56] References Cited

U.S. PATENT DOCUMENTS

| 383,017 | 5/1888 | Scribner . | |
|---|---|---|---|
| 1,514,555 | 11/1924 | Meehan . | |
| 1,754,628 | 4/1930 | Janson | 179/175 |
| 3,261,926 | 7/1966 | Bryant et al. | 179/175.1 |
| 3,773,986 | 11/1973 | Tremblay | 179/125.3 R |
| 3,872,383 | 3/1975 | Kolodziej | 324/51 |
| 3,944,758 | 3/1976 | Carney et al. | 179/175 |

Primary Examiner—Stafford D. Schreyer
Attorney, Agent, or Firm—David H. Semmes; Warren E. Olsen

[57] ABSTRACT

Telephone testing equipment, particularly a telephone subscriber test set of the type enabling the subscriber to isolate malfunction either in the household interior telephone equipment, including interior household lines and telephone receivers, or in the telephone company central office lines. A test circuit is connected to the household interior lines, so as be interposed between the telephone company central office lines and the household receiver. This test circuit includes a normally "open" test switch, a transformer and a dial tone speaker. As the test switch is "closed", the dial tone, emanating from the telephone company central office lines is amplified through the test circuit speaker. The device includes an especial extension test unit for use in households, having more than one telephone receiver.

7 Claims, 5 Drawing Figures

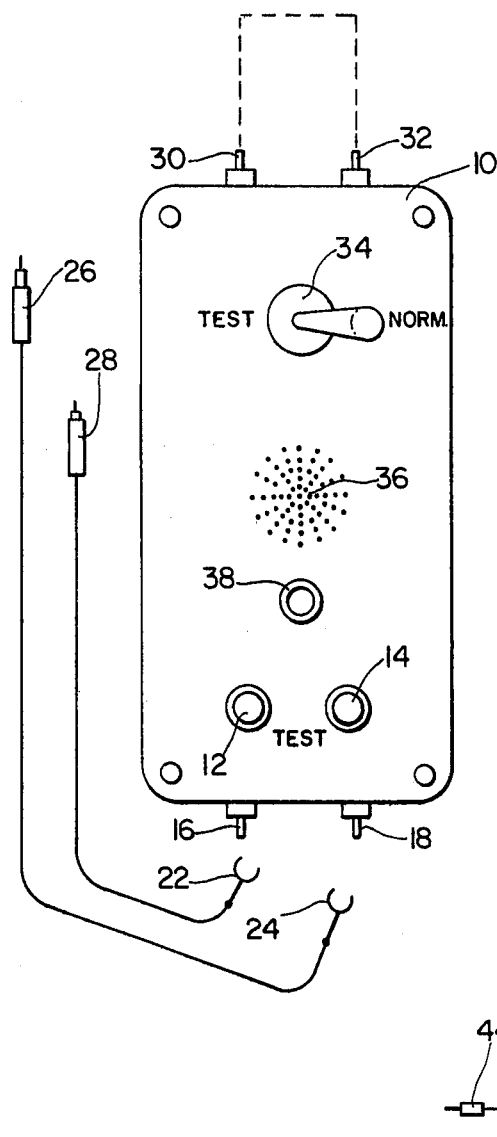
FIG. 1
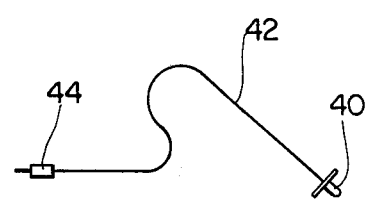
FIG. 2
FIG. 4
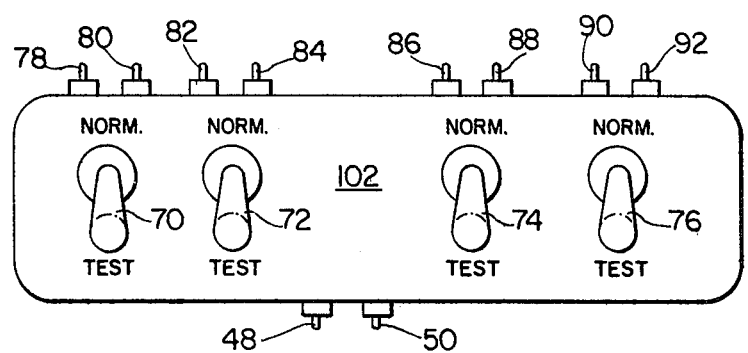

SUBSCRIBER TELEPHONE TEST SET

BACKGROUND OF THE INVENTION:

1. Field of the Invention:

Telephone testing equipment, particularly a device enabling the household subscriber to isolate trouble either within the telephone company central office lines, leading to the household or within the household interior telephone equipment.

2. Description of the Prior Art

| | |
|---|---|
| SCRIBNER | 383,017 |
| MEEHAN | 1,514,555 |
| JANSON | 1,754,628 |
| BRYANT et al. | 3,261,926 |
| KOLODZIEJ | 3,872,383 |

The aforelisted patents are discussed in a PRIOR ART STATEMENT being submitted separately.

SUMMARY OF THE INVENTION

A telephone subscriber test set of the type enabling the household subscriber to isolate trouble either within the household interior telephone equipment, which includes interior household lines and telephone receivers, or within the telephone company central office lines, extending to the household lines. The unit includes a normally "closed" interior household telephone line switch mounted in the household interior lines and adapted for passing the dial tone directly to the household telephone receiver, unless "opened" for test of the telephone company central office lines. A test circuit is connected to the household interior lines, so as to be interposed between the telephone company central office lines and the household telephone receiver. The test circuit includes a normally "open" master test switch, a transformer and a dial tone speaker, adapted to amplify the dial tone emanating from the central office lines, as the master test switch is "closed". An extension test circuit is provided for those homes having more than one telephone receiver and enables individual tests of the respective telephone receivers.

DESCRIPTION OF THE DRAWINGS

FIG. 1 is a schematic view of the telephone test set, as interposed between the telephone company central office lines and the household interior telephone lines.

FIG. 2 is a schematic view of the optional earplug extension which may be used in connection with the test circuit.

FIG. 4 is a schematic of the optional four extension test unit.

DESCRIPTION OF THE PREFERRED EMBODIMENTS

Figure 3:
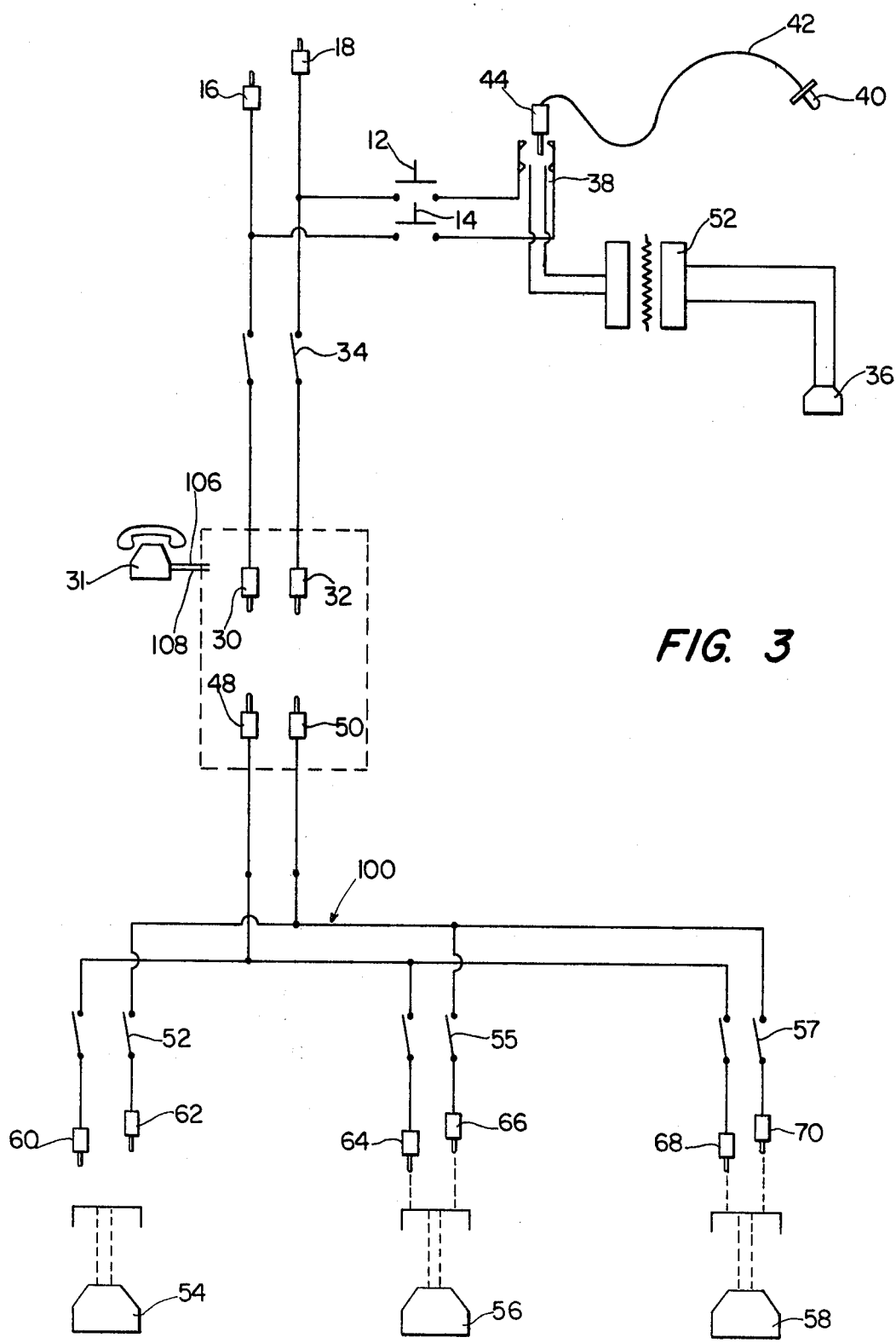
FIG. 3 is a schematic of the telephone test circuit and the optional three extension test unit.

In FIG. 1, telephone subscriber test set 10 is illustrated as having "press to test" switches 12 and 14; outlet jacks 16, 18 for connection to the conventional telephone company central office lines; outlet jacks 30 and 32 for connection to the household interior lines; dial tone speaker 36, and optional earplug jack 38. A pair of portable test leads 26, 28 is illustrated as being connected to outlet jacks 16, 18 by means of clamps 22, 24.

In FIG. 2 there is illustrated the earplug circuit 42, having earplug 40 and connecting jack 44. This earplug may be used in the test circuit illustrated in FIG. 3.

In FIG. 3 the telephone company central office lines are illustrated as extending directly via jacks 16, 18 to the individual household telephone receiver 31 by means of outlet jacks 30, 32, and interior receiver lines 106, 108. A normally "closed" interior household telephone line switch 34 is interposed in the household interior lines. The telephone test circuit includes a normally "open" master test switch 12, 14, earplug outlet jack 38, transformer 52 and dial tone speaker 36.

In the event that the telephone company office central lines are to be tested, interior household telephone line switch 34 is "opened", while master test switch 12, 14 is "closed", such that the dial tone emanating in the central office lines may be amplified through transformer 52 and dial tone speaker 36.

In the lower part of FIG. 3 the three extension test unit is illustrated as connected by means of leads 48, 50 to the household outlet jacks 30, 32. The individual household telephone receivers 54, 56 and 58 have individual, normally "closed", switches 52, 55 and 57. As illustrated, these switches are connected via outlet jacks 60, 62, outlet jacks 64, 66 and outlet jacks 66, 68 to the respective telephone receivers.

In FIG. 4 there is illustrated a four extension unit test set 102, having test switches 70, 72, 74, 76, each respectively including jacks 78, 80, jacks 82, 84, jacks 86, 88, and jacks 90, 92 which are connected to the individual telephone receivers. Jacks 48, 50 are provided for connection to the household test unit lines 100.

Figure 5:
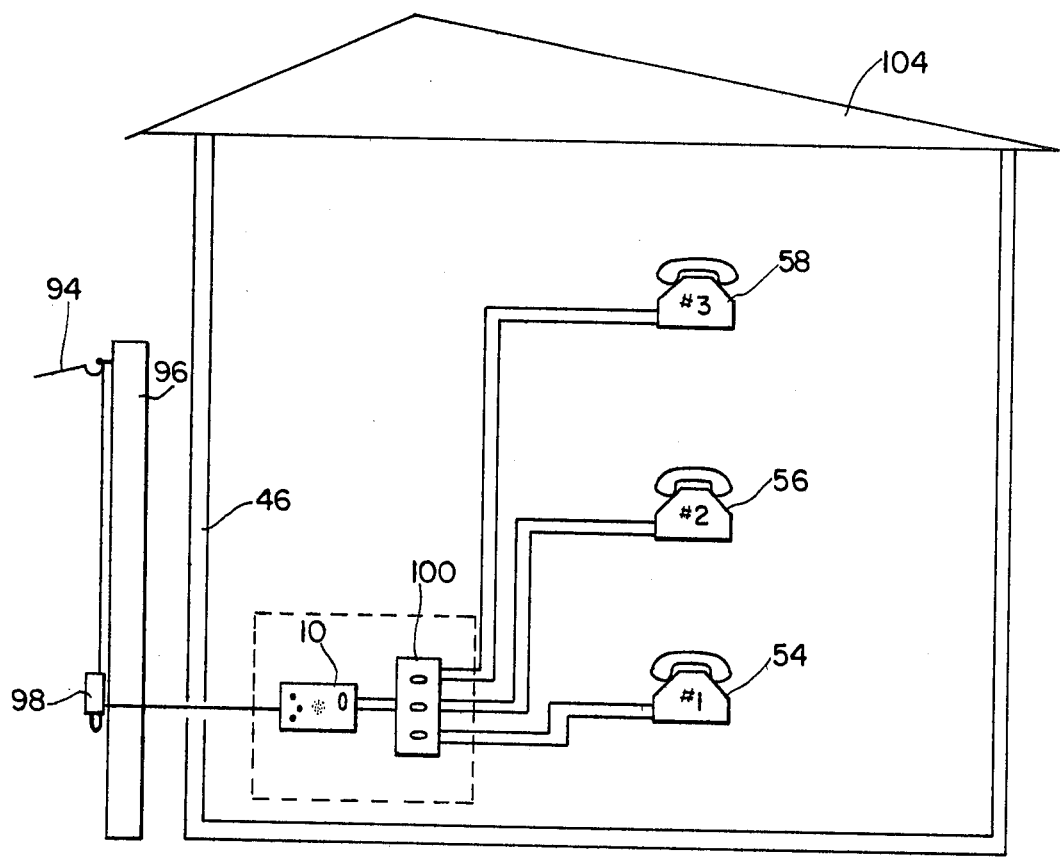
FIG. 5 is a schematic view, showing installation of the subscriber telephone test set and three extension test unit in a conventional household.

In FIG. 5, a household involving three extension receivers is illustrated. The telephone company drop wire 94 is illustrated as leading to stub pole 96, having outside protector 98. The telephone company lines lead directly through the household wall 46 to subscriber telephone test set 10, thence to the three extension test unit 100. The individual telephone receivers 54, 56, 58 may then be tested by means of the circuit illustrated in the lower half of FIG. 3.

Testing procedure may include:

I. TESTING IN HOUSEHOLD HAVING A SINGLE TELEPHONE RECEIVER

1. Press the master test switch buttons 12, 14 and listen for dial tone.

2. If you get dial tone on test unit 10 after pressing master test switch buttons 12, 14 and the household receiver 31 is still "dead", the trouble is inside the home or subscriber equipment.

3. If you don't get dial tone, flip interior household telephone line switch 34 to "open" or test position. Press test buttons 12, 14. If you get dial tone from test unit 10, the trouble is in subscriber telephone equipment, or in the house.

4. If you still do not get a dial tone after pressing master test buttons 12, 14, with interior household telephone line switch 34 in test or "open" position, then the trouble is outside in the telephone company transmission lines.

TESTING IN HOUSEHOLD HAVING SEVERAL TELEPHONE RECEIVERS

1. After the preceding tests are made and the trouble is found to be inside the home, by flipping individual telephone extension test switches 54, 56, 58 (FIG. 3) or 70, 72, 74, 76 (FIG. 4) to the "closed" or test position and pressing master switches 12, 14, you can narrow the trouble down to the exact extension giving the trouble.

Earplug circuit 42 is optional. When it is used and plugged into jack 38 on the test unit, it disconnects speaker 36 and you get the dial tone through earplug 40.

The subscriber telephone test set was designed to fill a need which will exist after Mar. 1, 1982, at which time the Federal Communications Commission ruling will go into effect to deregulate subscriber telephone station equipment. As a result of deregulating the subscriber station equipment, the telephone subscriber will buy and own all of the telephone equipment from the exterior protector connection 98 to the inside of the home. This will consist of all inside wire, connection blocks, jacks and plugs and the telephone receiver, including extensions. Consequently, the responsibility for maintenance of the equipment will stop at the exterior protector for the telephone company and the responsibility for maintenance of the equipment from the protector inward will be assumed by the subscriber.

Manifestly, unless there is some way for the subscriber to detect whether the trouble is located in the telephone company equipment or the subscriber-owned equipment, the subscriber will be forced to call the telephone company to locate the trouble. Unless the subscriber has a contract with the telephone company for their service, he could be billed for a service call.

This subscriber telephone test set is designed in two separate parts, the telephone subscriber test set 10 and the extension test unit 102. If the customer has only one telephone, the basic telephone subscriber test set 10 will be sufficient. If he has several extensions, he can use the extension unit 102 to determine, which household telephone is causing the trouble. However, it is not necessary for the subscriber to use the extension test unit 102 in conjunction with the basic subscriber telephone test set 10. The subscriber may still isolate the trouble within the household or within the telephone company lines. If he wishes, he can use the extension test unit 102 in conjunction with the basic subscriber telephone test set 102, so as to isolate the trouble within the specific extension. When using this procedure, once the trouble is isolated within a specific extension telephone, then the respective extension test switch may be left in the test or "open" position and all of the other extension telephone receivers will still be operational. This is a vast improvement over conventional testing procedures. At the present time, if one extension telephone receiver "shorts out", all the extension telephones will be inoperative, until the troublesome extension is disconnected.

At this time there is not a test set on the market, which does the same job, as the present subscriber telephone test set. There are professional test sets, designed for use by telephone companies with technical personnel, who have many years of training. The retail price of these test sets is $100.00 or more. However, for the average telephone subscriber, purchase of such sets is not necessary. Applicant's basic subscriber telephone test set should sell for about $30.00 to $35.00 each, which is within reach of most, if not all, telephone subscribers. Also, this test unit is simple to operate and should present no problem to anyone in the household.

This test unit is designed, such that when interior household line switch 34 is in the normal "closed" position, the telephone company line leads directly to the household telephone receiver. Only when the "press to test" master switches 12, 14, are pressed downwardly is the dial tone directed through the test set 10 dial tone speaker 36 or earplug 40. The test set 10 was designed in this manner, so as to prevent damage to the test circuit by lightning.

I claim:

1. A telephone subscriber test set of the type enabling the subscriber to isolate trouble both in the household interior telephone equipment, including interior household lines and telephone receiver, and in the telephone company central office exterior lines, extending to the household lines, comprising:
   A. A normally "closed" interior household telephone line switch mounted in the household interior lines and adapted for passing the telephone company dial tone directly to the household telephone receiver, unless "opened" for test of the telephone company central office lines; and
   B. A central office exterior lines test circuit connected to the household interior lines between the telephone company central office lines and the interior household telephone line switch so as to isolate trouble in the central office lines, said central office lines test circuit including:
      i. a normally "open" master test switch mounted in said test circuit;
      ii. a transformer mounted in said test circuit having a first winding in series with said master test switch, and a second winding; and
      iii. a dial tone speaker in shunt with said second winding, said test circuit adapted to amplify the dial tone emanating in the central office lines, as the master test switch is "closed".

2. A telephone subscriber test set as in claim 1, further including:
   C. A plural telephone receiver extension test unit attached to the household interior lines and leading to each of several household telephone receivers, each receiver having a normally "closed" extension test switch mounted in the extension test circuit, such that the "closing" of said master test switch in said central office line circuit and selective "opening" of said extension test switches may isolate trouble within an individual household receiver which does not amplify the dial tone.

3. A telephone subscriber test set as in claim 2, said interior telephone line switch, said master test switch and each said extension test switch being of the double pole, single throw type.

4. A telephone subscriber test set as in claim 3, said test circuit further including an earphone jack and earphone adapter, so as to enable audible receipt of the dial tone, independently of said dial tone speaker.

5. A telephone subscriber test set as in claim 4, including a pair of portable test leads, said leads having at one end clamps attachable to the telephone company central office lines and at the other end test leads attachable to testing equipment.

6. A telephone subscriber test set as in claim 5, wherein said extension test unit includes at least three normally "closed" extension test switches connected respectively to at least three household extension receivers.

7. A telephone subscriber test set as in claim 6, wherein said extension test unit includes at least four normally "closed" extension test switches, connected to respective household receivers.

* * * * *